United States Patent
Kim

(10) Patent No.: US 7,580,388 B2
(45) Date of Patent: Aug. 25, 2009

(54) METHOD AND APPARATUS FOR PROVIDING ENHANCED MESSAGES ON COMMON CONTROL CHANNEL IN WIRELESS COMMUNICATION SYSTEM

(75) Inventor: Myeong Cheol Kim, Aachen (DE)

(73) Assignee: LG Electronics Inc., Seoul (KR)

( * ) Notice: Subject to any disclaimer, the term of this patent is extended or adjusted under 35 U.S.C. 154(b) by 749 days.

(21) Appl. No.: 11/065,872

(22) Filed: Feb. 25, 2005

(65) Prior Publication Data
US 2005/0266846 A1  Dec. 1, 2005

Related U.S. Application Data

(60) Provisional application No. 60/576,214, filed on Jun. 1, 2004, provisional application No. 60/589,630, filed on Jul. 20, 2004.

(51) Int. Cl.
*H04W 4/00* (2009.01)
(52) U.S. Cl. .......................... 370/329; 455/39; 455/68; 370/341
(58) Field of Classification Search ................ 370/235, 370/236, 232, 270, 276, 277, 278, 282, 311, 370/327, 328, 329, 331, 340, 360, 436, 438, 370/455
See application file for complete search history.

(56) References Cited

U.S. PATENT DOCUMENTS

| 6,463,504 | B1* | 10/2002 | Ishibashi et al. ............ 709/213 |
| 6,473,410 | B1 | 10/2002 | Sakoda et al. |
| 6,628,946 | B1 | 9/2003 | Wiberg et al. |
| 6,684,081 | B2 | 1/2004 | Sarkkinen et al. |
| 6,956,832 | B1* | 10/2005 | Muhonen et al. ............ 370/310 |
| 7,199,608 | B1* | 4/2007 | Trimberger .................. 326/38 |
| 7,301,926 | B1* | 11/2007 | Dietrich et al. ............. 370/338 |
| 2002/0041578 | A1* | 4/2002 | Kim et al. .................... 370/335 |
| 2002/0128035 | A1 | 9/2002 | Jokinen et al. |
| 2003/0156558 | A1* | 8/2003 | Cromer et al. .............. 370/331 |
| 2003/0207696 | A1* | 11/2003 | Willenegger et al. ........ 455/522 |
| 2004/0224688 | A1* | 11/2004 | Fischer ..................... 455/435.1 |

FOREIGN PATENT DOCUMENTS

RU  2145775  2/2000

* cited by examiner

*Primary Examiner*—Chirag G Shah
*Assistant Examiner*—Otis L Thompson, Jr.
(74) *Attorney, Agent, or Firm*—Lee, Hong, Degerman, Kang & Waimey

(57) ABSTRACT

A method and apparatus for providing new configurations for transmitting control information between a mobile terminal and a network using a common control channel (CCCH) logical channel/transport channel. The new configurations enable messages to be sent that are larger than currently allowed and the availability of the new configurations is indicated such that mobile terminals that do not support the new configurations are not impacted.

65 Claims, 13 Drawing Sheets

METHOD AND APPARATUS FOR PROVIDING ENHANCED MESSAGES ON COMMON CONTROL CHANNEL IN WIRELESS COMMUNICATION SYSTEM

CROSS-REFERENCE TO RELATED APPLICATIONS

This application claims the benefit of U.S. Provisional Application Ser. Nos. 60/576,214 filed on Jun. 1, 2004, and 60/589,630, filed on Jul. 20, 2004, the contents of which are hereby incorporated by reference herein in their entirety.

BACKGROUND OF THE INVENTION

1. Field of the Invention

The present invention relates to a method and apparatus for enhancing the signaling between a mobile communication device and a network. Specifically, the present invention is directed to a method and apparatus for providing new configurations for transmitting control information between a mobile terminal, for example user equipment (UE), and a radio network controller (RNC) using a common control channel (CCCH) logical channel/transport channel.

2. Discussion of the Related Art

The universal mobile telecommunications system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology.

In December 1998, the ETSI of Europe, the ARIB/TTC of Japan, the T1 of the United States, and the TTA of Korea formed a Third Generation Partnership Project (3GPP). The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

A conventional UMTS network structure 1 is illustrated in FIG. 1. One mobile terminal 2, or user equipment (UE), is connected to a core network 4 through a UMTS terrestrial radio access network (UTRAN) 6. The UTRAN 6 configures, maintains, and manages a radio access bearer for communications between the UE 2 and core network 4 to meet end-to-end quality-of-service requirements.

The UTRAN 6 consists of at least one radio network subsystem 8, including one RNC 10 acting as an access point to the core network 4, and at least one Node B 12 managed by a corresponding RNC. The RNCs 10 are logically classified as controlling RNCs, which allocate and manage common radio resources for a plurality of UEs 2 of a cell, and serving RNCs, which allocate and manage dedicated radio resources for a specific UE 2 of a cell. Each Node B 12 manages at least one cell.

The core network 4 may be divided according to the type of service provided, namely, a circuit-switched (CS) domain and a packet-switched (PS) domain. For example, a general voice conversation service is a circuit switched (CS) service, while a Web browsing service via an Internet connection is classified as a packet switched (PS) service.

The CS domain includes a mobile switching center (MSC) 14 acting as an access point to the UTRAN 6 and a gateway mobile switching center (GMSC) 16 acting as an access point to an external network. The PS domain includes a serving GPRS support node (SGSN) 18 acting as an access point to the UTRAN 6 and a gateway GPRS support node (GGSN) 20 acting as an access point to the external network. A visitor location register (VLR) 22 and a home location register (HLR) 24 manage user registration information.

In the CS domain, the access point of the core network 4 is the MSC 14 via an Iu-CS interface. For supporting circuit switched services, the RNCs 10 are connected to the MSC 14 of the core network 4 and the MSC is connected to the GMSC 16 that manages the connection with other networks.

In the PS domain, the access point of the core network 4 is the SGSN 18 via an Iu-PS interface. For supporting packet switched services, the RNCs 10 are connected to the SGSN 18 and the GGSN 20 of the core network 4. The SGSN 18 supports the packet communications with the RNCs 10 and the GGSN 20 manages the connection with other packet switched networks, such as the Internet.

The interface between the UE 2 and UTRAN 6 is realized through a radio interface protocol established in accordance with 3GPP radio access network specifications. The conventional architecture of the radio interface protocol is illustrated in FIG. 2.

As illustrated in FIG. 2, the conventional radio interface protocol has horizontal layers comprising a physical layer (L1), a data link layer (L2), and a network layer (L3), and has vertical planes comprising a user plane (U-plane) for transmitting user data and a control plane (C-plane) for transmitting control information. The user plane is a region that handles traffic information with the user, such as voice or Internet protocol (IP) packets. The control plane is a region that handles control information for an interface with a network and maintenance and management of a call.

The protocol layers may be divided into a first layer (L1), a second layer (L2), and a third layer (L3) based on the three lower layers of an open system interconnection (OSI) standard model. The first layer (L1) is the physical layer. The second layer (L2) includes a medium access control (MAC) layer, a radio link control (RLC) layer, a broadcast/multicast control (BMC) layer, and a packet data convergence protocol (PDCP) layer.

The physical (PHY) layer provides information transfer service to a higher layer by using various radio transfer techniques. The physical layer is linked via transport channels to a medium access control (MAC) layer.

The MAC layer handles mapping between logical channels and transport channels and provides allocation of the MAC parameters for allocation and re-allocation of radio resources. The MAC layer is connected to the physical layer by transport channels and may be divided into a MAC-b sub-layer, a MAC-d sub-layer, a MAC-c/sh sub-layer, and a MAC-hs sub-layer according to the type of transport channel being managed.

The MAC layer is connected to an upper layer called the radio link control (RLC) layer, via a logical channel. Various logical channels are provided according to the type of information transmitted. In general, a control channel is used to transmit information of the control plane and a traffic channel is used to transmit information of the user plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH), or a Shared Channel Control Channel. The BCCH provides information including information utilized by a UE 2 to access the core network 4. The PCCH is used by the UTRAN 6 to access a UE 2. The different logical channels are listed in FIG. 3.

The MAC-b sub-layer manages a BCH (Broadcast Channel), which is a transport channel handling the broadcasting of system information. In the downlink, the MAC-c/sh sub-layer manages a common transport channel, such as a forward access channel (FACH) or a downlink shared channel (DSCH), which is shared by a plurality of terminals. In the uplink, the MAC-c/sh sub-layer manages a Radio Access Channel (RACH). Therefore, each UE 2 has one MAC-c/sh entity.

The possible mapping between the logical channels and the transport channels from the perspective of a UE 2 is illustrated in FIG. 4. The possible mapping between the logical channels and the transport channels from the perspective of a UTRAN 6 is illustrated in FIG. 5.

The MAC-d sub-layer manages a dedicated channel (DCH), which is a dedicated transport channel for a UE 2. The MAC-d sublayer is located in a serving RNC 10 (SRNC) that manages a corresponding UE 2, and one MAC-d sublayer also exists in each UE 2.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto.

The data units, called protocol data units (PDUs), are transferred to the MAC layer via a logical channel. The RLC layer includes a RLC buffer for storing the RLC SDUs and/or the RLC PDUs. The RLC services are used by service-specific protocol layers on the user plane, namely a broadcast/multicast control (BMC) protocol and a packet data convergence protocol (PDCP), and are used by a radio resource control (RRC) layer for signaling transport on the control plane.

The BMC layer schedules a cell broadcast (CB) message delivered from the core network 4 and enables the CB message to be broadcast to the corresponding UEs 2 in the appropriate cell. Header information, such as a message identifier, a serial number, and a coding scheme, is added to the CB message to generate a BMC message for delivery to the RLC layer.

The RLC layer appends RLC header information and transmits the thus-formed message to the MAC layer via a common traffic channel as a logical channel. The MAC layer maps the common traffic channel to a forward access channel (FACH) as a transport channel. The transport channel is mapped to a secondary common control physical channel as a physical channel.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer handles the control plane signaling of the network layer (L3) between the UEs 2 and the UTRAN 6 and controls the transport and physical channels for the establishment, reconfiguration, and release of radio bearers. A radio bearer is a service provided by a lower layer, such as the RLC layer or MAC layer, for data transfer between the UE 2 and UTRAN 6.

The air interface (Uu) between the UE 2 and the UTRAN 6 includes the RRC layer for the establishment, reconfiguration, and release of radio bearers, for example a service providing data transfer between the UE and an RNC 10 of the UTRAN. Establishment of a radio bearer determines the regulating characteristics of the protocol layer and channel needed to provide a specific service, thereby establishing the parameters and operational methods of the service.

A UE 2 is said to be in the RRC-connected mode when the RRC layer of a UE and the RRC layer of a corresponding RNC 10 are connected, thereby providing for bi-directional transfer of RRC messages. If there is no RRC connection, the UE 2 is said to be in the RRC-idle mode.

Upon power-up, a UE 2 is in the RRC-idle mode by default. When necessary, an RRC-idle UE 2 transitions to the RRC-connected mode through an RRC connection procedure.

An RRC connection is established, for example, when uplink data transfer is needed to make a call or to respond to a paging message from the RNC 10. The RRC connection connects the UE 2 to the RNC 10 of the UTRAN 6.

The different possibilities that exist for the mapping between the radio bearers and the transport channels are not all possible all the time. The UE 2 and UTRAN 6 deduce the possible mapping depending on the UE state and the procedure that the UE and UTRAN are executing.

The different transport channels are mapped onto different physical channels. For example, the RACH transport channel is mapped on a given PRACH, the DCH may be mapped on the DPCH, the FACH and the PCH may be mapped on the S-CCPCH, and the DSCH is mapped on the PDSCH. The configuration of the physical channels is determined by RRC signaling exchange between the RNC 10 and the UE 2.

Because an RRC connection exists for UEs 2 in RRC connected mode, the UTRAN 6 can determine the existence of a particular UE within the unit of cells, for example in which cell or set of cells the RRC connected mode UE resides, and which physical channel the UE is monitoring. Therefore, the UE 2 can be effectively controlled.

In contrast, the UTRAN 6 cannot determine the existence of a UE 2 in idle mode. The existence of idle UEs 2 can only be determined by the core network 4 to be within a region that is larger than a cell, for example a location or a routing area. Therefore, the existence of idle mode UEs 2 is determined within large regions, and, in order to receive mobile communication services such as voice or data, the idle mode UE must transition into the RRC connected mode. The possible transitions between modes and states are illustrated in FIG. 6.

A UE 2 in RRC connected mode may be in different states, for example CELL_FACH state, CELL_PCH state, CELL_DCH state or URA_PCH state. Depending on the state, the UE 2 performs different actions and monitors different channels.

For example a UE 2 in CELL_DCH state will attempt to monitor, among others, a DCH type of transport channel that is mapped to a certain DPCH. A UE 2 in CELL_FACH state will monitor several FACH transport channels that are mapped to a certain S-CCPCH. A UE 2 in CELL_PCH state will monitor the PICH channel and the PCH channel that is mapped to a certain S-CCPCH physical channel.

The actions of a UE 2 are also different depending on the state. For example a UE 2 is in CELL_FACH state whenever it moves from one cell into another cell and, depending on different conditions, the UE will start the CELL Update procedure by transmitting a Cell Update message to the Node B 12 to indicate that the UE has changed location and will begin monitoring the FACH channel. This procedure is also performed when the UE 2 transitions from any other state to CELL_FACH state and the UE has no C-RNTI available, for example when transitioning from CELL_PCH state or CELL_DCH state, or when a UE in CELL_FACH state was previously out of a coverage area.

In order to distinguish transmissions between the RNC 10 and the different UEs 2 and in order to distinguish the different radio bearers that may be multiplexed in the MAC layer, the MAC includes a header in the transmissions. The logical channel type determines the type of MAC header that the UE 2 uses to transmit the message, the UMTS mode (FDD or TDD) and the transport channel to which the logical channel is mapped. This header may contain an identifier that identifies a specific UE 2.

There are different identifiers used in the MAC header to distinguish transmissions to/from the different UEs 2. The RNC 10 allocates the different identifiers.

Examples of identifiers are C-RNTI, U-RNTI, S-RNTI and H-RNTI. C-RNTI is used to identify a given UE 2 in a given cell. U-RNTI is used to identify a UE 2 in a given UTRAN 6 system. S-RNTI identifies the UE 2 on a DSCH transport channel. H-RNTI identifies the UE 2 on a given HSDPA transport channel.

The fields that are contained in the MAC header for all transport channels except the HS-DSCH transport channel are illustrated in FIG. 7. The TCTF (Target Channel Type Field) field indicates the type of logical channel that is mapped on the given transport channel in the event different logical channels may be mapped on the transport channel. The UE-Id type is the UE 2 identifier. The C/T field indicates the radio bearer that was established.

The TCTF is utilized to distinguish between the different logical channels. Distinguishing between logical channels determines the exact format of the rest of the MAC header. For example, If the CCCH is mapped on RACH /FACH, the MAC header contains only the TCTF field that carries the information that the rest of the MAC PDU contains a message from a CCCH type transport channel.

Presently, the UMTS standard indicates that only the signaling radio bearer 0 (SRB0) may use the CCCH logical channel. Therefore there is no need for the C/T field when the CCCH logical channel is used.

In the uplink, not all transport channels are available depending upon the state of the UE 2. For example when the UE 2 is in CELL_FACH state, the UE cannot use a DCH transport channel, but may use, for example, a RACH transport channel.

For the mapping of DCCH on RACH, for example, the UE 2 must have a valid C-RNTI. However, if the UE 2 has just moved into a new cell and desires to start the Cell Update procedure, the UE does not have a valid C-RNTI. Therefore, the UE 2 may only map the CCCH logical channel on the RACH. In coding the CCCH message, an "initial Identity," which is either fixed or allocated to the UE 2 by the core network 4, or the U-RNTI is included in the message to distinguish the UE 2.

The same situation exists when the UE 2 has just been powered on and wants to establish an RRC connection. Therefore, the UE 2 may only use CCCH logical channel mapped on the RACH transport channel to transmit the RRC Connection Request message.

The RLC layer may use either transparent mode (TM), unacknowledged mode (UM) or acknowledged mode (AM). Depending upon the mode, the size of the RLC PDUs may change after each transmission of a transport block. In TM and UM mode, the size of the RLC PDUs may change after each transmission. In AM, the PDU size may not be changed dynamically, but only through a reconfiguration by the RNC 10, because the PDUs might be retransmitted.

The transport channels may handle RLC PDUs of predefined sizes. The transport block size of the physical layer is defined by the RLC PDU size and the MAC header size. Different transport channels allow different transport block sizes and a given transport channel may also allow different sizes. Generally, the transport block sizes a UE 2 is allowed to use for a specific radio bearer are determined by the RNC 10 or fixed by the UMTS standard.

A transport channel is defined by its type, for example RACH, FACH, DCH, DSCH or USCH, and by its attributes. Some attributes are dynamic and some attributes are semi-static.

Dynamic attributes include the transport block size, which is the size of the MAC PDU; the transport block set size, which is the size of the MAC PDU multiplied by the number of MAC PDUs that can be transported in one transmission time interval (TTI); and the transmission time interval, which is an optional dynamic attribute for TDD only. Semi-static attributes include the transmission time interval, which is mandatory for FDD and optional for the dynamic part of TDD NRT bearers; the error protection scheme applied; the type of error protection; the turbo code; the convolutional code; no channel coding, which is semi-static for TDD only; the coding rate; the static rate matching parameter; and the size of CRC.

The semi static part of an attribute may only be changed when the RRC layer changes the configuration. The dynamic part of an attribute provides several alternatives, for example that there may be one, two or three transport blocks transmitted in one TTI. Furthermore, the transport block size may be changed during each TTI.

A set of values of the dynamic and the semi-static parts is called a transport format (TF). Each transport channel may use one or more transport formats. For example, only one transport channel may be mapped on the Physical Random Access Channel (PRACH), the channel to which the present invention is directed.

The PRACH message includes a data portion that is generated out of the transport block set received by the MAC layer and includes control information that is generated in the Physical layer. The control information includes the transport format combination indicator (TFCI) that is used to determine the coding and the transport format that is used for the transmission. FIG. 8 illustrates the RACH message structure.

When a radio bearer is mapped via a logical channel to a transport channel, not all existing transport format combinations may be used. The allowable transport format combinations are determined by the RRC protocol, as indicated by the RB mapping information.

Presently, the UMTS standard indicates that signaling radio bearer number 0 (SRB0) is always mapped via a CCCH logical channel on the RACH transport channel. Presently, the UMTS standard also indicates that a UE2 is only allowed to use the first transport format that is listed for the selected RACH for transmission of messages via CCCH.

Generally, the first transport format of a RACH may carry only one transport block of 168 bits. However, the messages that are transmitted via the CCCH may be large and, in some situations, it may be beneficial to use also other transport block sizes.

The CCCH is fixed to always use TM mode in the uplink. TM mode does not support segmentation and padding. The MAC header always includes only the TCTF header, which consists of 2 bits. Therefore, the RRC message that is carried in the MAC SDU must be adapted to meet the required size of the MAC SDU.

RRC messages are generated using a special coding known as ASN.1 coding. FIG. 9 illustrates ASN.1 coding of an RRC message for CCCH.

The different information elements that form the R99 part and the extension part are encoded by the means of the ASN.1 to create the basic production. The encoder adds padding bits to ensure that the number of bits is a multiple of 8. In order to adapt the RRC PDU size to the size of the MAC-SDU for the CCCH messages on TM, the RRC layer adds additional padding.

The CCCH logical channel is used to transmit Cell Update messages, RRC connection request messages and URA update messages in the uplink. The messages have different sizes depending upon the information that is added to the message. The messages also contain information on the measured results of neighboring cells, for example quality and timing information such as measured results on RACH.

Conventional methods adapt the size of the messages transmitted on the CCCH logical channel so that the RLC PDU with the MAC header fits inside the transport block that is used in the RACH. A conventional method 1 for transmitting messages on the CCCH logical channel is illustrated in FIG. 10.

As illustrated in FIG. 10, information regarding the existing PRACH configurations is transmitted to a UE 2 (S10). Based on the existing transport PRACH configurations, the UE 2 selects the PRACH according to an algorithm (S12). The UE 2 generates a message including all information elements for transmission over the PRACH (S14). The UE 2 compares the message size with the transport block size of the first transport format of the corresponding RACH and adapts the message size by deleting measurement information until the message fits within the transport block size (S16). The UE 2 then transmits the adapted message via the PRACH (S18).

In a UMTS system several PRACHs may be configured in a cell. A UE 2 in RRC-idle or RRC-connected mode reads a list of PRACH channels from the system information blocks. Each PRACH channel may have a list of available transport formats.

In TDD (Time Division Duplex), the TTI (Transmission Time Interval), or duration of the transmission of a transport block, of a PRACH may be different depending on the transport format. In 1.28 MCPS TDD mode, the UE 2 always selects the largest TTI of the transport formats that are suitable for transmission of the transport block set.

In FDD (Frequency Division Duplex), each PRACH channel has a fixed TTI. Each transport format is characterized, among other characteristics, by a transport block size and the number of transport blocks that may be transmitted during one TTI.

In order to select the PRACH, the UE 2 first must select the TTI to be applied. Once the TTI is selected, the UE 2 selects one PRACH channel randomly from the PRACHs that exist that use the selected TTI length. If PRACHs with different TTI lengths exist, the TTI length is selected according to the method 50 illustrated in FIG. 11. Otherwise, the TTI of the configured PRACHs is utilized.

Referring to FIG. 11, the UE 2 selects a transport format with 10 msec. TTI based on the available transport formats in step S52. From the transport formats supported by all RACHs, those formats that have a TTI of 10 msec. and correspond to a single transport block of all configured RLC sizes are kept.

For example, the RLC size applicable for RBO is kept in RRC-idle mode and the RLC sizes configured with explicit RB mapping information are kept in RRC-connected mode. If more than a single transport format is applicable, the UE 2 may select any of the available formats.

Preferably, the UE 2 selects the transport format that is intended for use by the next transmission. If such information is not available, the transport format corresponding to the largest configured RLC size is selected.

In step S54, the UE 2 calculates the power margin by estimating the transmit power necessary to transmit a transport block set on the RACH with a given transport format. The algorithm used for this calculation is specified by the 3GPP standard and uses, among other input parameters, the TTI, the transport block size and the number of transport blocks to be transmitted.

In step S56, the calculated power margin is compared to 6 dB. If the power margin is greater than 6 dB, the 10 msec. TTI is selected in step S58. If the calculated power margin is not greater than 6 db, the 20 msec. TTI is selected in step S60.

If the size of a CCCH message is too large using the conventional methods 1, 50, a UE2 might completely delete the information on the measured results of neighboring cells, for example measured results on RACH, even though the quality and timing information might be needed in the RNC 10. Without the quality and timing information, a connection may not be established with the RNC 10 when a UE 2 moves to another cell. The UE 2 may not be able to transmit data and a current call may be interrupted or a new call may not be initiated.

Because the UMTS standard restricts a UE 2 to always use the first transport block size of the selected PRACH, there is only one transport block size available for SRB0. Therefore, the size of the messages is limited to the size of the transport block.

It has been suggested to change the size of the first transport format of the PRACH. However, there is no guarantee that all mobiles terminals will support a size change of the SRB0. Therefore, as long as there are mobile terminals that do not support another transport block size used in the PRACH, messages that are transmitted via the CCCH in the uplink may not be extended in new Releases of the UMTS standard.

Therefore, there is a need for a method and apparatus that conforms to a new UMTS standard that allows messages to be transmitted via the CCCH channel that are larger than the currently available transport block size, while not impacting the operation of mobile terminals that do not conform to the new UMTS standard. The present invention addresses these and other needs.

SUMMARY OF THE INVENTION

The present invention is directed to a method and apparatus for enhancing the signaling between a mobile communication device and a network. Specifically, the invention is directed to a method and apparatus for providing new configurations for transmitting control information between a mobile and a network using a common control channel logical channel /transport channel such that the operation of mobile terminals that do not support the new configurations is not impacted.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method and apparatus that enhances the signaling between a mobile communication device and a network. Specifically, new configurations for transmitting control information between a mobile and a network using a common control channel (CCCH) logical channel /transport channel are provided and an indication is provided from a network regarding which of the new configurations are available for use such that previously available configurations are still available for mobile terminals that do not support the new configurations.

In one aspect of the present invention, a method is provided for transmitting control information to a network. The method includes receiving an information message indicating one or more available configurations for transmitting a message, selecting one of available configurations and transmitting a message utilizing the selected configuration.

It is contemplated that the available configurations may include a legacy configuration mode and legacy configuration identity. The legacy configuration mode is a configuration mode for transmitting a message that may be utilized by mobile terminals that do not support the new configurations provided by the present invention.

It is contemplated that the available configurations may include a predefined configuration mode and predefined configuration identity. The predefined configuration mode is a new configuration for transmitting a message that is provided by the present invention.

It is contemplated that the new configurations provided by the present invention may include an additional channel, an increased message block size for an existing channel, a new channel mapping configuration, and /or a new message format. Preferably the selection of one of the available configurations is based on the size of a message to be transmitted.

It is contemplated that a new logical channel and /or a new physical channel may be provided. It is further contemplated that an increased message size may be provided for an existing channel, preferably a logical channel and /or a physical channel. Moreover, it is contemplated that a new channel mapping configuration may be associated with mapping a logical channel to a physical channel.

It is contemplated that the information message indicating the available configurations for transmitting a message may be received via a common channel. Preferably, the information indicating the available configurations is included in an extension portion of the information message.

It is contemplated that the information message indicating the available configurations for transmitting a message may be received via a dedicated channel. Preferably the information message is an RRC connection setup message.

In another aspect of the present invention, a method is provided for transmitting control information between at least one mobile communication device and a network. The method includes providing new configurations for transmitting a message in one or more mobile communication devices, the new configurations including an additional channel, an increased message block size for an existing channel, a new channel mapping configuration, and /or a new message format, transmitting an information message indicating the new configurations from the network to one or more mobile communication devices, selecting one of the new configurations in the mobile communication devices and transmitting a message utilizing the selected configuration from the mobile communication devices to the network.

It is contemplated that a new logical channel and /or a new physical channel may be provided. It is further contemplated that an increased message size may be provided for an existing channel, preferably a logical channel and /or a physical channel. Moreover, it is contemplated that a new channel mapping configuration may be associated with mapping a logical channel to a physical channel. Preferably the selection of one of the new configurations is based on the size of a message to be transmitted.

It is contemplated that the information message indicating the new configurations for transmitting a message may be transmitted via a common channel to a plurality of mobile communication devices. Preferably, the information indicating the available configurations is included in an extension portion of the information message such that mobile communication devices that do not incorporate the new configurations do not interpret the information.

It is contemplated that the information message indicating the new configurations for transmitting a message may be transmitted via a dedicated channel to a specific mobile communication device. Preferably the information message is an RRC connection setup message.

In another aspect of the present invention, a method is provided for transmitting control information to a network. The method includes transmitting an information message indicating one or more available configurations for transmitting a message and receiving a message transmitted utilizing one of the available configurations.

It is contemplated that the available configurations may include a legacy configuration mode and legacy configuration identity. The legacy configuration mode is a configuration mode for transmitting a message that may be utilized by mobile terminals that do not support the new configurations provided by the present invention.

It is contemplated that the available configurations may include a predefined configuration mode and predefined configuration identity. The predefined configuration mode is a new configuration for transmitting a message that is provided by the present invention.

It is contemplated that the new configurations provided by the present invention may include an additional channel, an increased message block size for an existing channel, a new channel mapping configuration, and /or a new message format. Preferably the information message is an RRC connection setup message.

It is contemplated that a new logical channel and /or a new physical channel may be provided. It is further contemplated that an increased message size may be provided for an existing channel, preferably a logical channel and /or a physical channel. Moreover, it is contemplated that a new channel mapping configuration may be associated with mapping a logical channel to a physical channel.

It is contemplated that the information message indicating the available configurations for transmitting a message may be transmitted via a common channel to a plurality of mobile terminals. Preferably, the information indicating the available configurations is included in an extension portion of the information message.

It is contemplated that the information message indicating the available configurations for transmitting a message may be transmitted via a dedicated channel to a specific mobile terminal. Preferably the information message is an RRC connection setup message.

In another aspect of the present invention, a mobile communication device is provided for transmitting control information to a network. The mobile communication device includes an RF module, an antenna, a keypad, a display, a storage unit, and a processing unit.

The antenna and RF module receive an information message from the network and transmit a message to the network. The keypad allows a user to enter information. The display conveys information to a user. The storage unit stores information associated with one or more configurations. The processing unit performs the methods of the present invention to process an information message indicating available configurations for transmitting a message, select one of the available configurations and transmit a message utilizing the selected configuration.

In another aspect of the present invention, a network is provided for transmitting control information to one or more mobile terminals. The network includes a transmitter, a receiver and a controller.

The transmitter transmits an information message to one or more mobile terminals. The receiver receives a message from one or more mobile terminals. The controller performs the methods of the present invention to generate an information message indicating one or more available configurations for transmitting a message and to process messages transmitted from one or more mobile terminals utilizing one of the available configurations.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
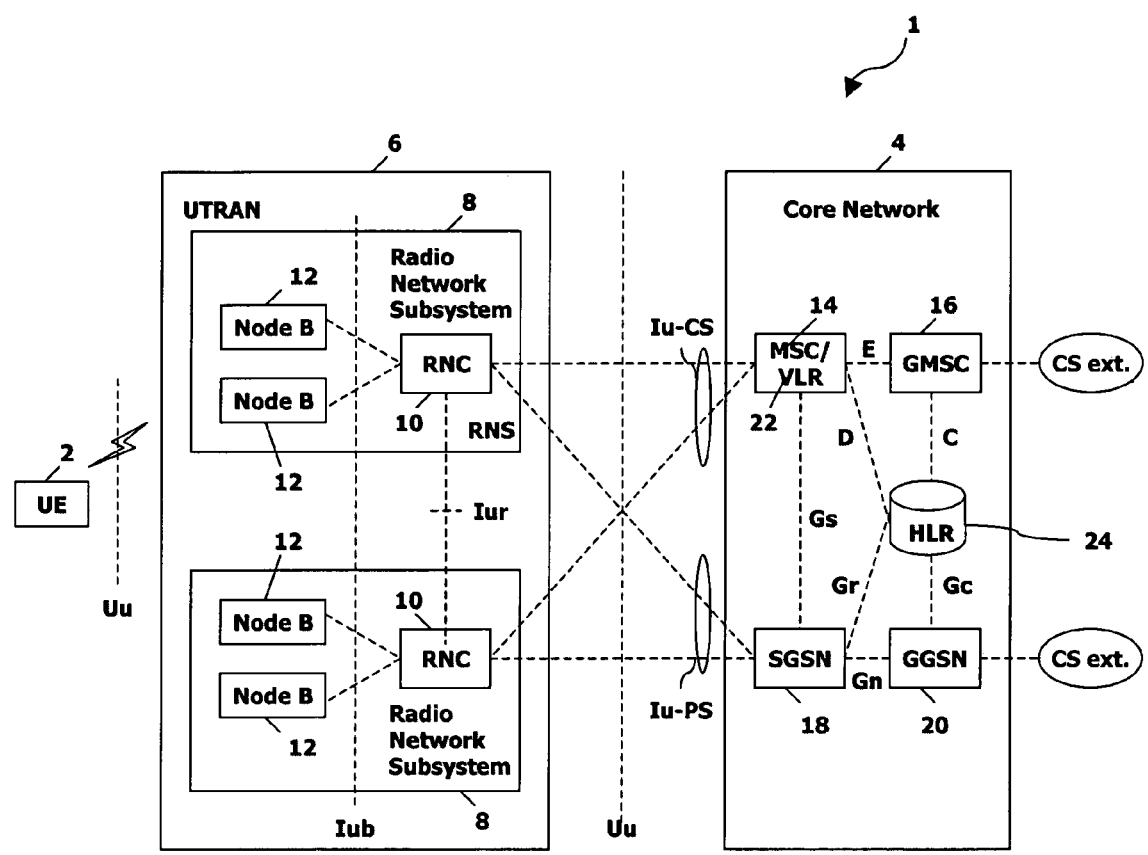
FIG. 1 illustrates a block diagram of a conventional UMTS network structure.
Figure 2:
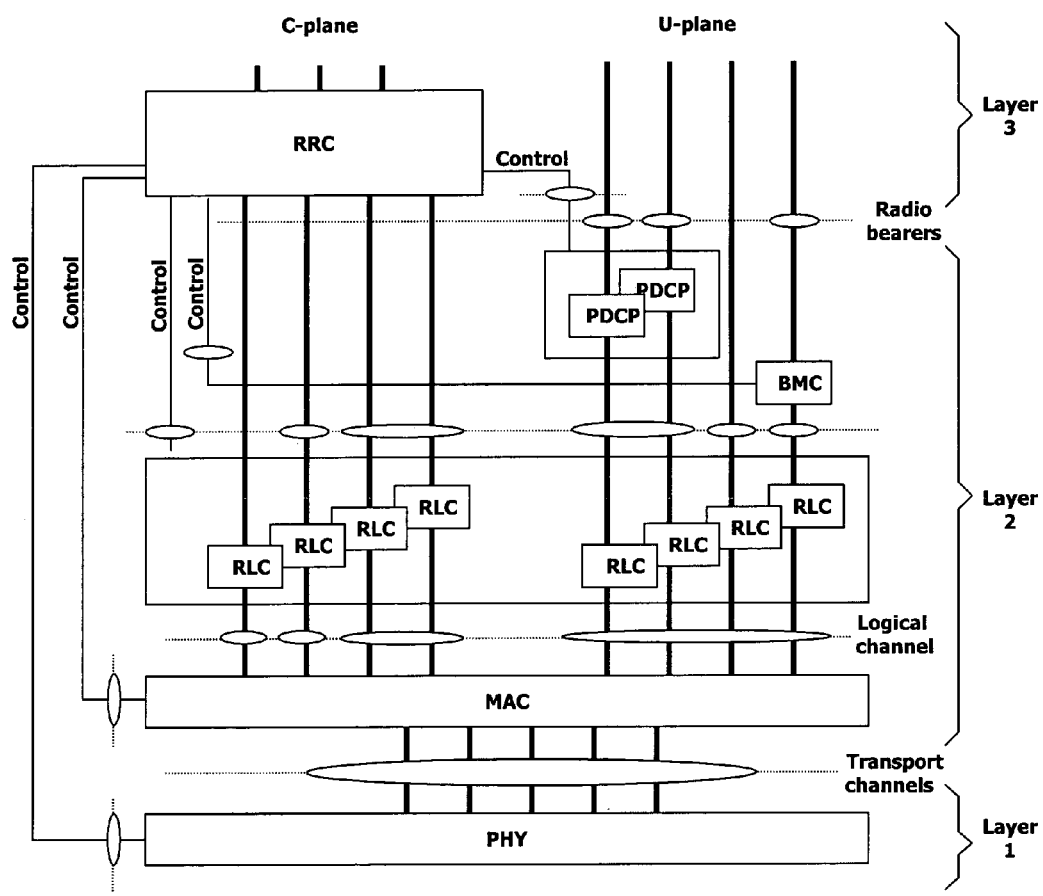
FIG. 2 illustrates a conventional radio interface protocol.
Figure 3:
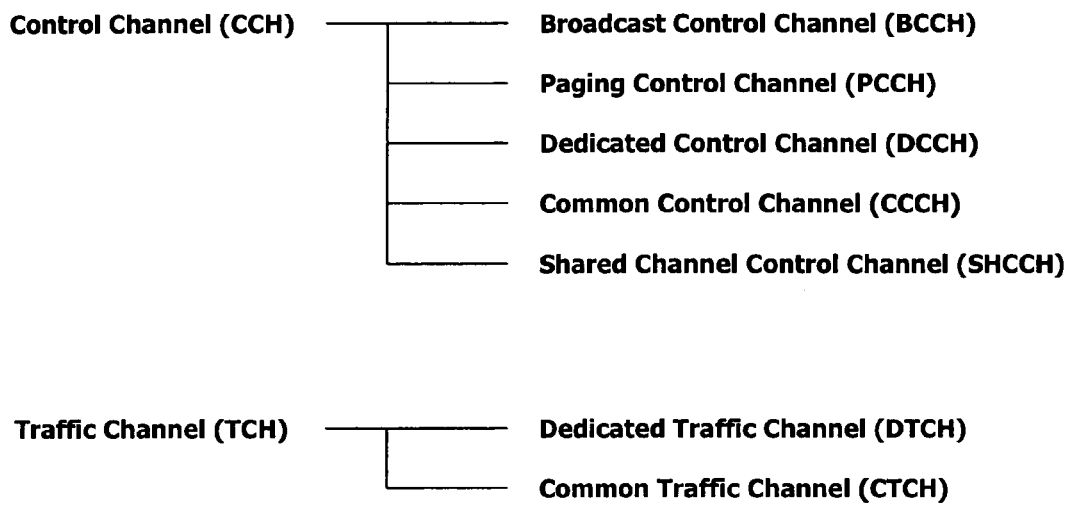
FIG. 3 illustrates different logical channels in a conventional radio interface protocol.
Figure 4:
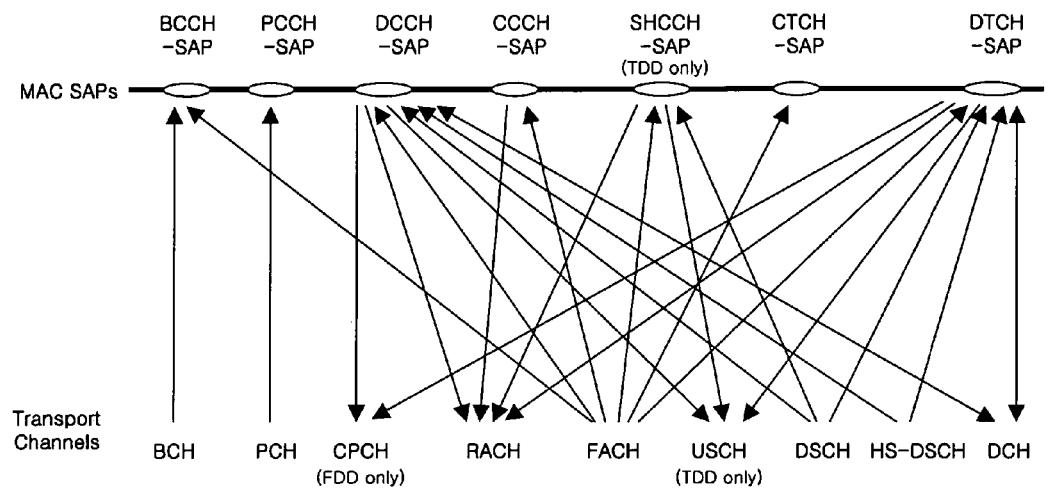
FIG. 4 illustrates possible mapping between the logical channels and the transport channels from the perspective of a mobile terminal in a conventional radio interface protocol.
Figure 5:
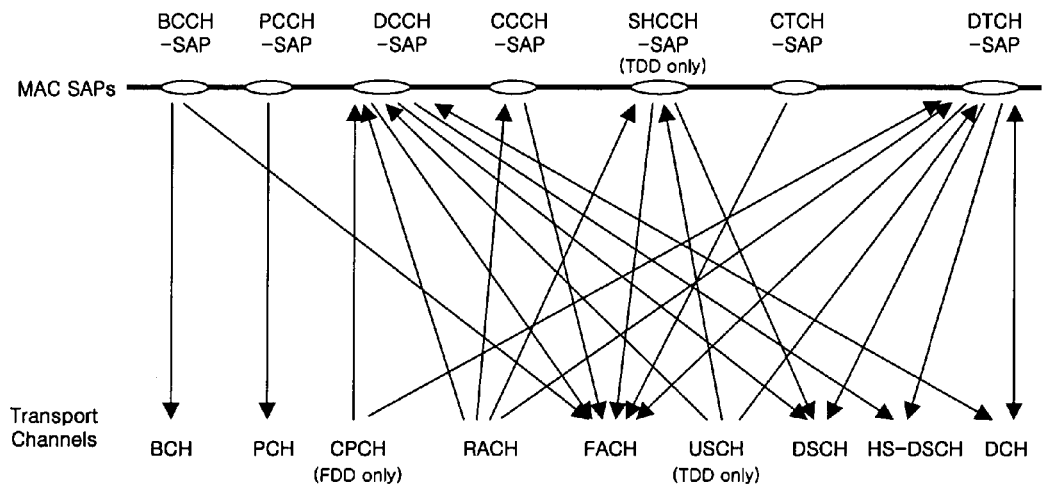
FIG. 5 illustrates possible mapping between the logical channels and the transport channels from the perspective of a core network in a conventional radio interface protocol.
Figure 6:
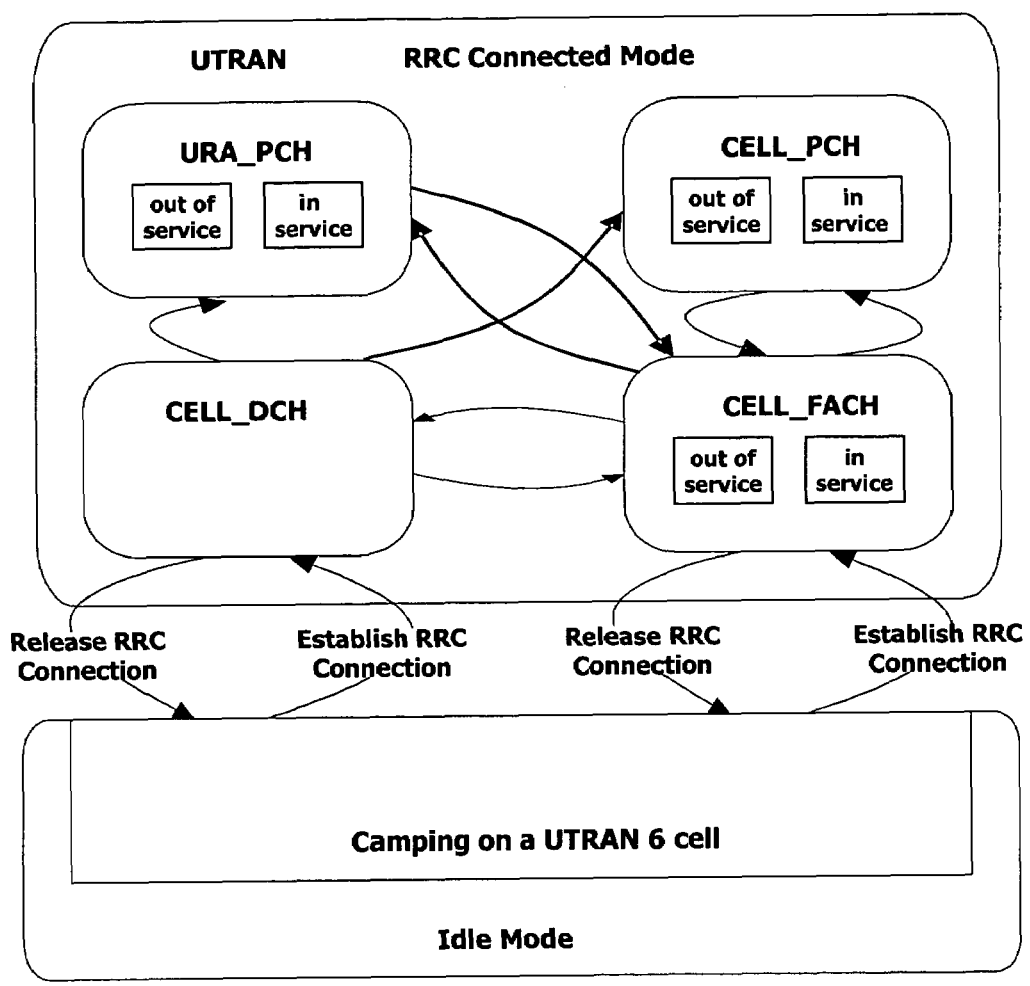
FIG. 6 illustrates possible transitions between modes and states of a conventional mobile terminal.
Figure 7:
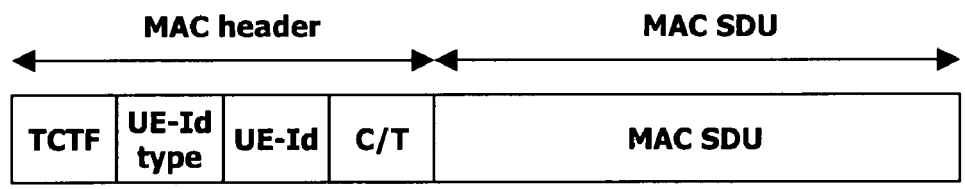
FIG. 7 illustrates the fields contained in the MAC header in a conventional radio interface protocol for all transport channels except the HS-DSCH transport channel.
Figure 8:
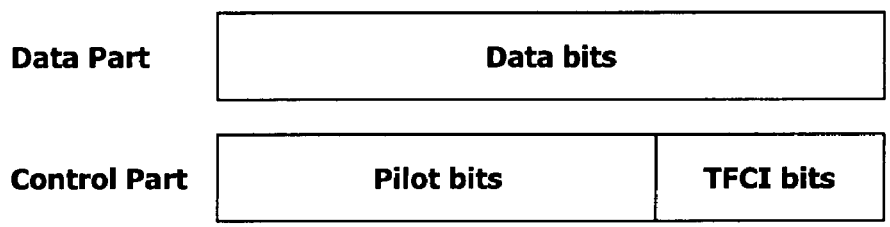
FIG. 8 illustrates the conventional RACH message structure.
Figure 9:
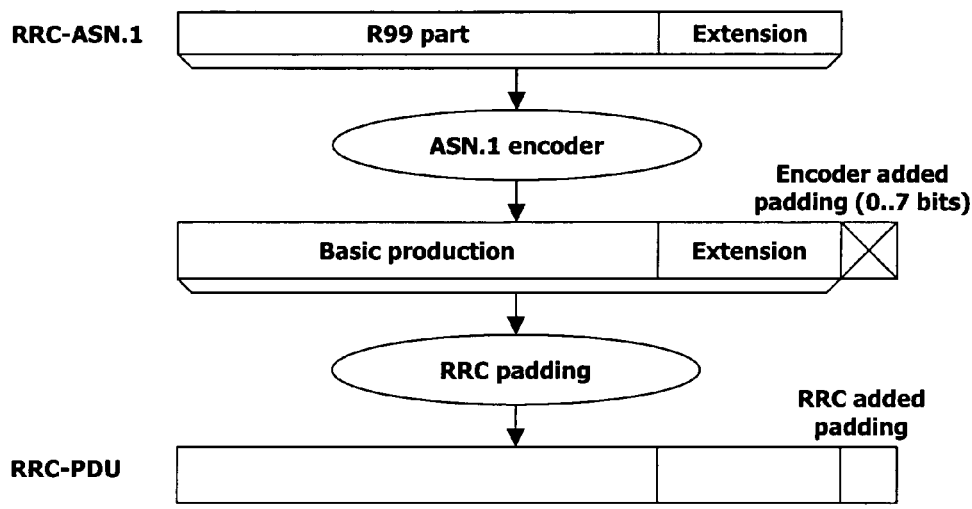
FIG. 9 illustrates the conventional ASN.1 coding of an RRC message for CCCH.
Figure 10:
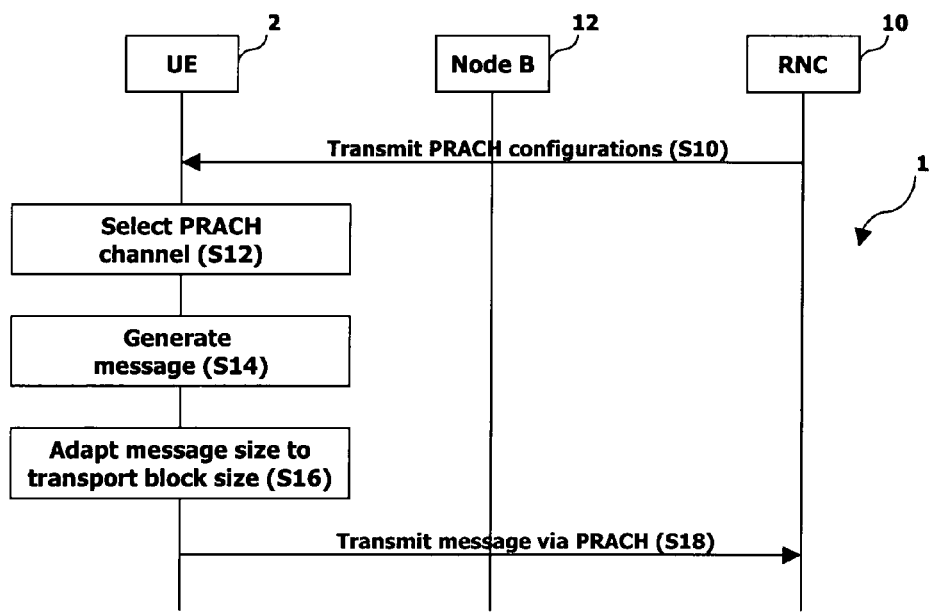
FIG. 10 illustrates a conventional method for transmitting messages on the CCCH logical channel.
Figure 11:
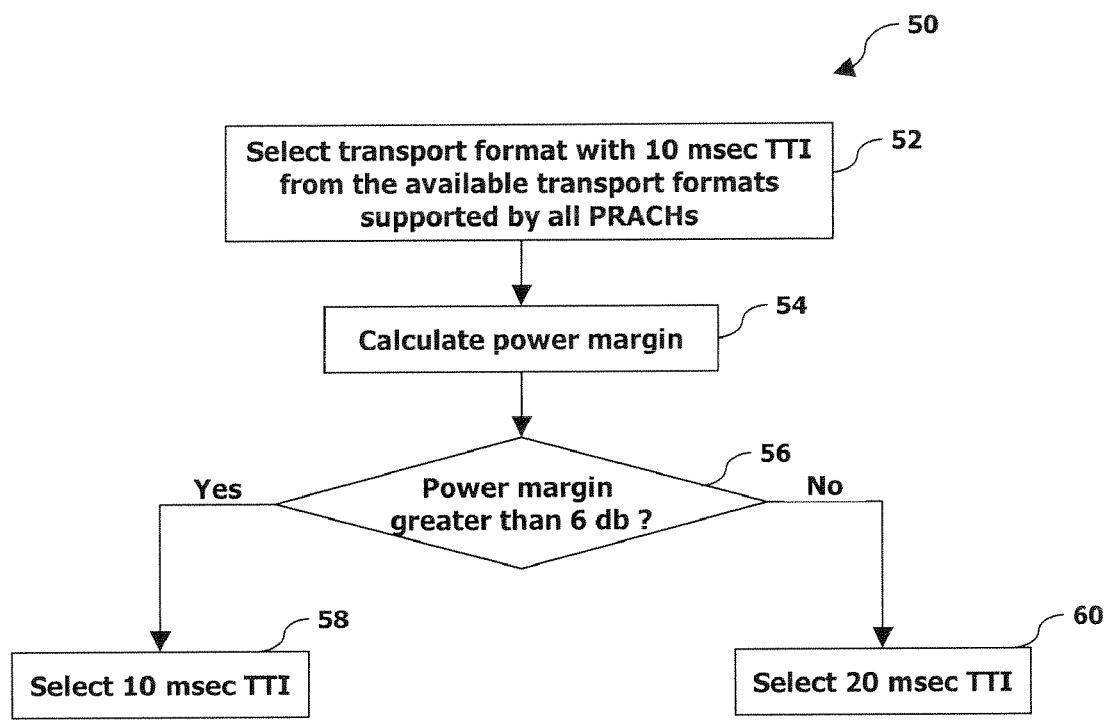
FIG. 11 illustrates a conventional method for selecting the TTI length in order to select the PRACH for transmission of messages in FDD (Frequency Division Duplex) mode.

The present invention relates to a method and apparatus for providing new configurations for transmitting control information between a mobile terminal, for example user equipment (UE), and a radio network controller (RNC) using a common control channel (CCCH) logical channel /transport channel such that the operation of mobile terminals that do not support the new configurations is not impacted. Although the present invention is illustrated with respect to a mobile terminal, it is contemplated that the present invention may be utilized anytime it is desired to provide new configurations for transmitting control information between a mobile communication device and a network.

Reference will now be made in detail to the preferred embodiments of the present invention, examples of which are illustrated in the accompanying drawings. Throughout the drawings, like elements are indicated using the same or similar reference designations.

The invention proposes to use a new configuration for the transmission of the RRC messages of SRB0. The new configuration is intended to enable messages to be transmitted over the CCCH that are larger than those currently allowed for transmission. Enabling larger messages, for example messages containing additional information, to be transmitted over the CCCH may prevent essential quality and timing information, for example measured results on RACH, from being deleted from the messages sent over the CCCH. There are several ways in which a new configuration may be implemented.

A first embodiment of the new configuration provides a new physical RACH channel (PRACH) which would be used only by UEs 2 that support the use of the additional PRACH. The new PRACH may be indicated utilizing the existing system information messages such that only UEs 2 that support the use of the new PRACH would utilize the new channel to transmit messages via the CCCH on the new PRACH.

A second embodiment of the new configuration allows a UE 2 to use a different transport format on the same RACH that is presently utilized to transmit messages via the CCCH. A new logical channel may be implemented, for example an enhanced common control channel (ECCCH), which may be mapped on any transport format combination of the available RACH channels. The RNC 10 would indicate whether a UE 2 is allowed to use the enhanced CCCH, for example in an existing system information message, RRC messages or any other messages transmitted from the RNC to the UE 2.

A third embodiment allows the mapping of the CCCH channel on other transport block sizes of the existing RACH. There would be no need to change the architecture of the UE 2 or core network 4, as only the mapping of the PRACH would be changed.

According to the third embodiment, the RNC 10 may signal whether the UE 2 is allowed to map the CCCH on any PRACH and whether any PRACH transport block size or only certain PRACH transport block sizes are allowed. The RNC 10 may indicate the numbers of the entries in the list of PRACH transport block sizes that are allowed. Alternately, the mapping of the CCCH channel on any PRACH may be allowed without any indication from the RNC 10.

A fourth embodiment allows a new message format to be utilized. The new message format may be adapted to include only the most necessary data. For example, the START values may be omitted in an RRC Connection Request message since the START values are also transmitted in the Initial Direct transfer message.

Figure 12:
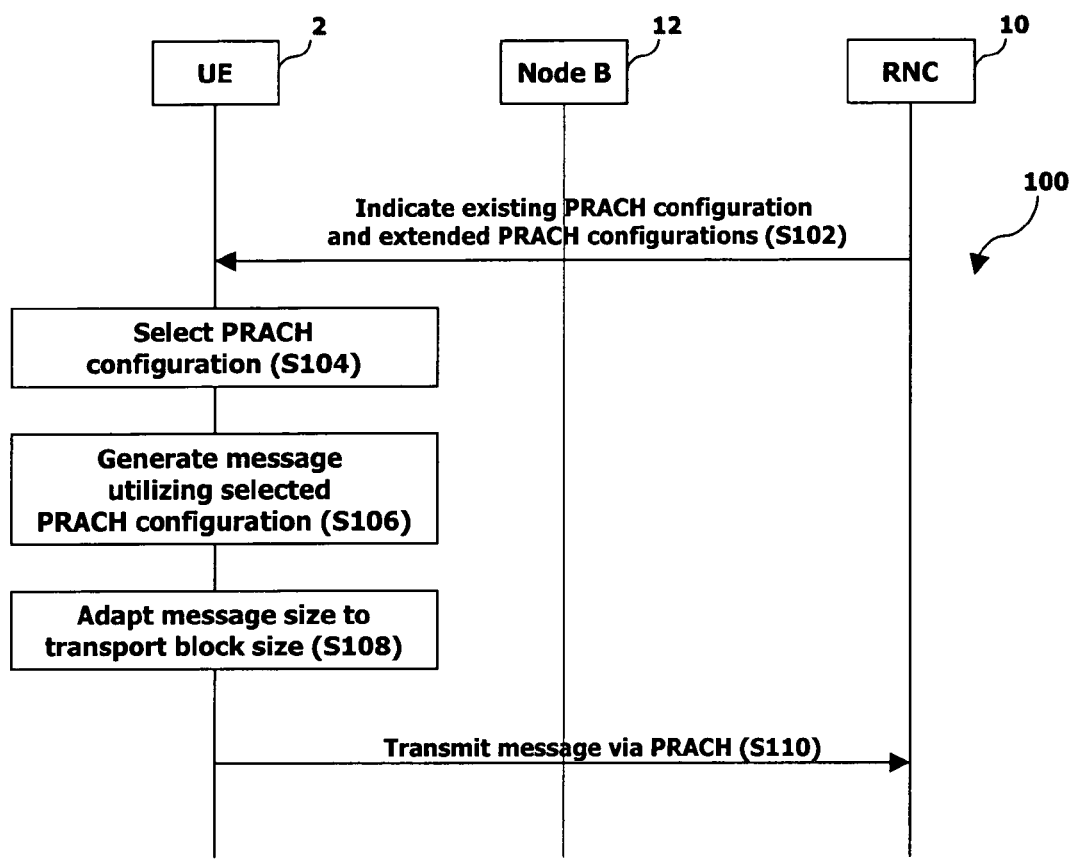
FIG. 12 illustrates a method for transmitting messages on the CCCH logical channel according to one embodiment of the present invention.

FIG. 12 illustrates a method 100 for selecting a configuration for transmitting a message via the PRACH according to one embodiment of the present invention. The method 100 includes transmitting information indicating the available PRACH configurations to a UE 2 (S102), selecting one of the available PRACH configurations (S104), generating a message to be transmitted using the selected PRACH configuration (S106), adapting the generated message to the transport block size if necessary (S108) and transmitting the message via the PRACH (S110).

In step S102, the RNC 10 transmits information to a UE 2 indicating the available PRACH configurations. The available PRACH configurations may include existing, or legacy configurations that are supported by all UEs 2 and /or predefined new, or extended, configurations that may not be supported by all UEs.

The extended PRACH configurations may incorporate one or more of the four embodiments previously defined; a new physical RACH channel, a new logical channel such as an enhanced common control channel (ECCCH), mapping of the CCCH channel on other transport block sizes of the existing RACH, and/or a new message format. The indication of the available PRACH configurations may include a configuration mode and configuration identity for each available legacy configuration and each available predefined configuration.

In step S104, the UE 2 selects one of the available PRACH configurations, for example by performing an algorithm that includes the existing PRACH configuration and the extended PRACH configurations. The selection between the existing PRACH configuration and the one or more extended PRACH configurations is based on the size of the message that is to be transmitted in order to select the PRACH configuration that allows a transport block size that accommodates all message data while adding a minimum amount of overhead.

Preferably, the UE 2 first determines if the transport block size of the existing PRACH configurations allow inclusion of all information regarding measured results of neighboring cells, for example quality and timing information such as measured results on RACH, in the message. If the transport block sizes of the existing PRACH configurations are insufficient to allow inclusion of all information regarding measured results of neighboring cells in the message, the UE 2 selects one of the extended PRACH configurations.

The UE 2 then generates a message to be transmitted including all information elements by utilizing the selected PRACH configuration in step S106. If the transport block size of the selected PRACH configuration is still insufficient to allow inclusion of all information regarding measured results of neighboring cells in the message, the UE 2 reduces the amount of information regarding measured results of neighboring cells that is included in the message in order to adapt the message size to the transport block size of the selected PRACH configuration in step S108.

In FDD (Frequency Division Duplex), if the UE2 is allowed to use additional transport formats or an enhanced ECCCH, the algorithm to determine the TTI of the available PRACHs is impacted. The TTI may be selected according to the method 150 in FIG. 13.

Figure 13:
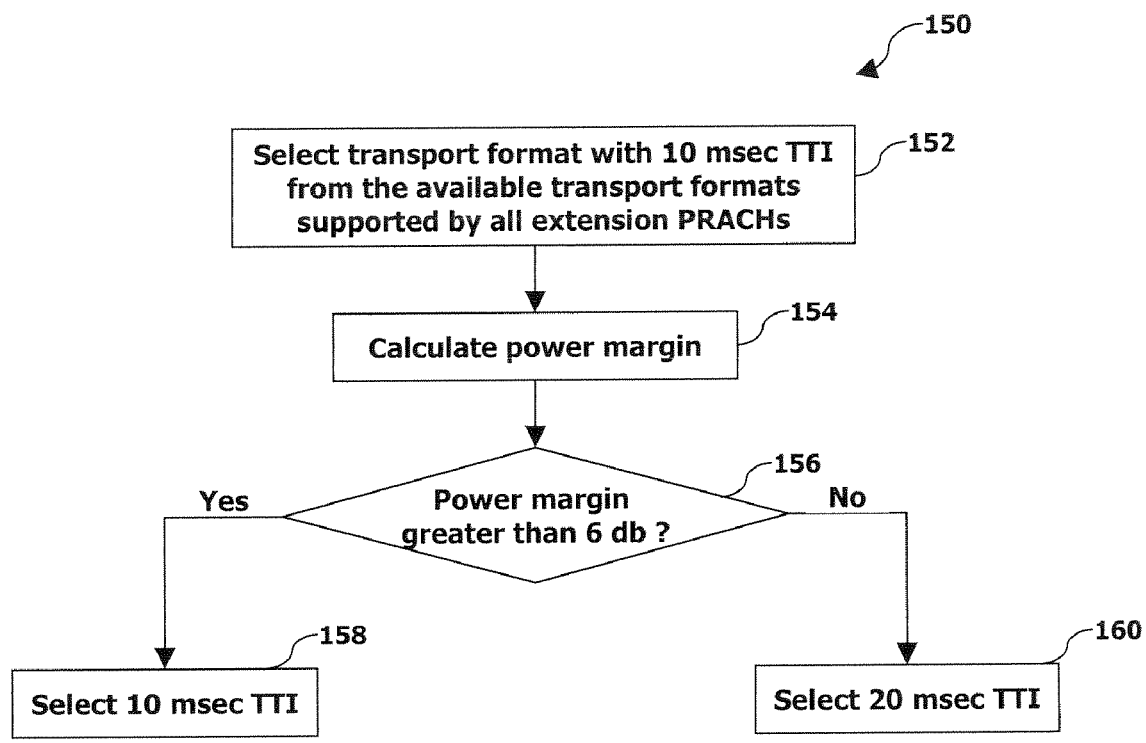
FIG. 13 illustrates a method for selecting the TTI length in order to select the PRACH for transmission of messages in FDD (Frequency Division Duplex) mode according to one embodiment of the present invention.

Referring to FIG. 13, the UE 2 selects a transport format with 10 msec. TTI based on the available transport formats in step S152. From the transport formats supported by all extension PRACHs, those formats that have a TTI of 10 msec. and correspond to a single transport block are kept. If more than a single transport format is applicable, the UE 2 may select any of the available formats.

Preferably, the UE 2 selects the transport format that is intended for use by the next transmission. For example, for RB0/CCCH, the smallest available RLC size that allows the next message to be transmitted is selected. If such information is not available or, if the largest RLC size is not large enough to accommodate the next message, the transport format corresponding to the largest configured RLC size is selected.

In step S154, the UE 2 calculates the power margin by estimating the transmit power necessary to transmit a transport block set on the RACH with a given transport format. The algorithm used for this calculation is specified by the 3GPP standard and uses, among other input parameters, the TTI, the transport block size and the number of transport blocks to be transmitted.

In step S156, the calculated power margin is compared to 6 dB. If the power margin is greater than 6 dB the 10 msec. TTI is selected in step S158. If the calculated power margin is not larger than 6 db, the 20 msec. TTI is selected in step S160.

The transport format for which the power margin is calculated should then be selected to be the transport format with a TTI of 10 msec. that allows transmission of the RB0/CCCH message. If several transport formats with a TTI of 10 msec. that allow transmission of the RB0/CCCH message exist, the format with the smallest transport block size is selected. If no such transport format exists, the transport format with the largest transport block size with 10 msec. TTI is selected.

In 1.28MCPS TDD mode, the UE 2 may select the transport format with a transport block size that is configured by explicit signaling. For SRB0/CCCH the UE 2 may select a transport format that allows transmission of the next message for SRB0. If no such transport format exists, the transport format with the biggest size should be selected, or if several transport formats are available, the transport format with the smallest transport block size should be chosen. If several transport formats with this transport block size exist, the UE 2 should select the largest TTI from those transport formats.

Figure 14:
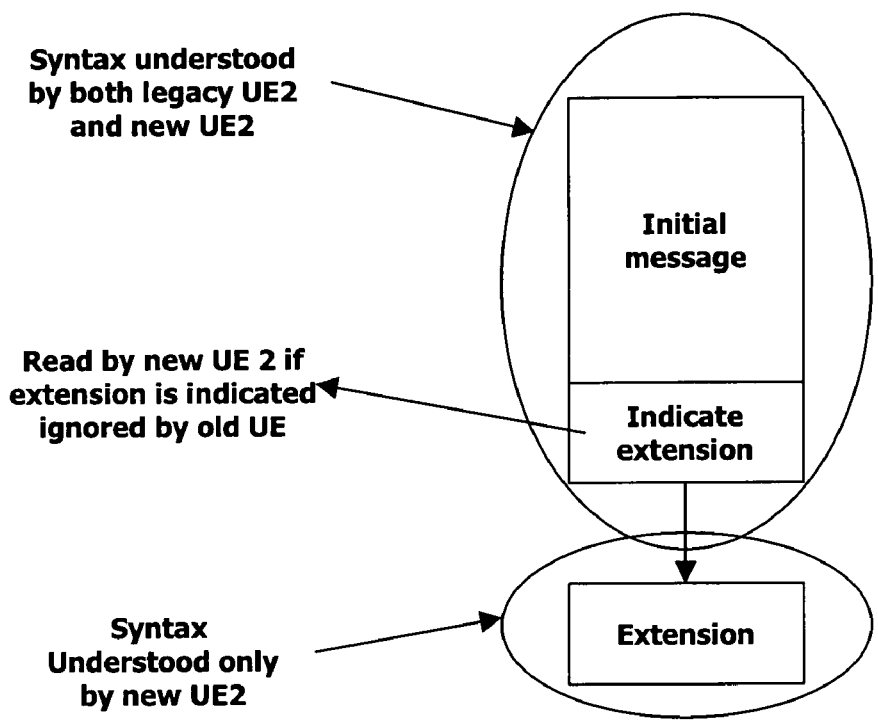
FIG. 14 illustrates a method for transmitting an indication of available PRACH configurations utilizing a message transmitted to a plurality of mobile terminals according to one embodiment of the present invention.

The method of transmitting information indicating the available PRACH configurations to a UE 2 must be performed in a manner such that UEs that do not support the new configurations are not impacted. The information indicating the available PRACH configurations may be transmitted to a UE 2 as an extension of the system information transmitted to a plurality of UEs 2, for example as part of a broadcast message on a common channel, as illustrated in FIG. 14. On the other hand, the information indicating the available PRACH configurations may be transmitted by dedicated RRC signaling on a dedicated channel as illustrated in FIG. 15.

As illustrated in FIG. 14, the portion of the message that contains information available according to the current 3GPP standard may be understood by both new UEs 2 that support the new configurations and legacy UEs that do not support the new configurations. The indication of extension information is read by new UEs 2 and ignored by legacy UEs. The extension information indicating the available PRACH configurations is understood only by new UEs 2 that support the new configurations.

Figure 15:
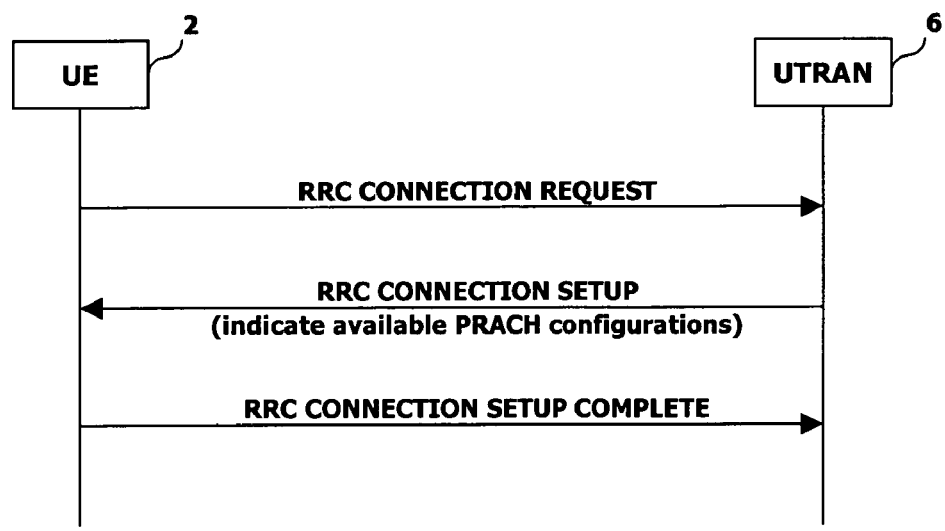
FIG. 15 illustrates a method for transmitting an indication of available PRACH configurations utilizing a message transmitted to a specific mobile terminal according to one embodiment of the present invention.

As illustrated in FIG. 15, the information indicating the available PRACH configurations is transmitted to a specific new UE 2 that supports the new configurations when a connection between a UTRAN 6 and the UE is established. The existing RRC connection setup message is utilized to indicate the available PRACH configurations.

The UE 2 requests an RRC connection by transmitting an RRC connection request message to the UTRAN 6. If the RRC connection can be accomplished, the UTRAN 6 transmits an RRC connection setup message to the UE 2.

The RRC connection setup message includes an indication of the available PRACH configurations if the UE supports the new configurations. The indicated available PRACH configurations may include a legacy configuration, for example the existing PRACH configuration, and one or more predefined new PRACH configurations, for example any the extended PRACH configurations incorporating the four embodiments previously defined. If the UE 2 is a legacy UE that does not support the new configurations, no indication of the available PRACH configurations is included in the RRC connection setup message.

The UE 2, upon receiving the RRC connection setup message, selects one of the available PRACH configurations and transmits an RRC connection setup complete message to the UTRAN 6. The UE 2 may then transmit messages via the PRACH by utilizing the selected PRACH configuration.

Figure 16:
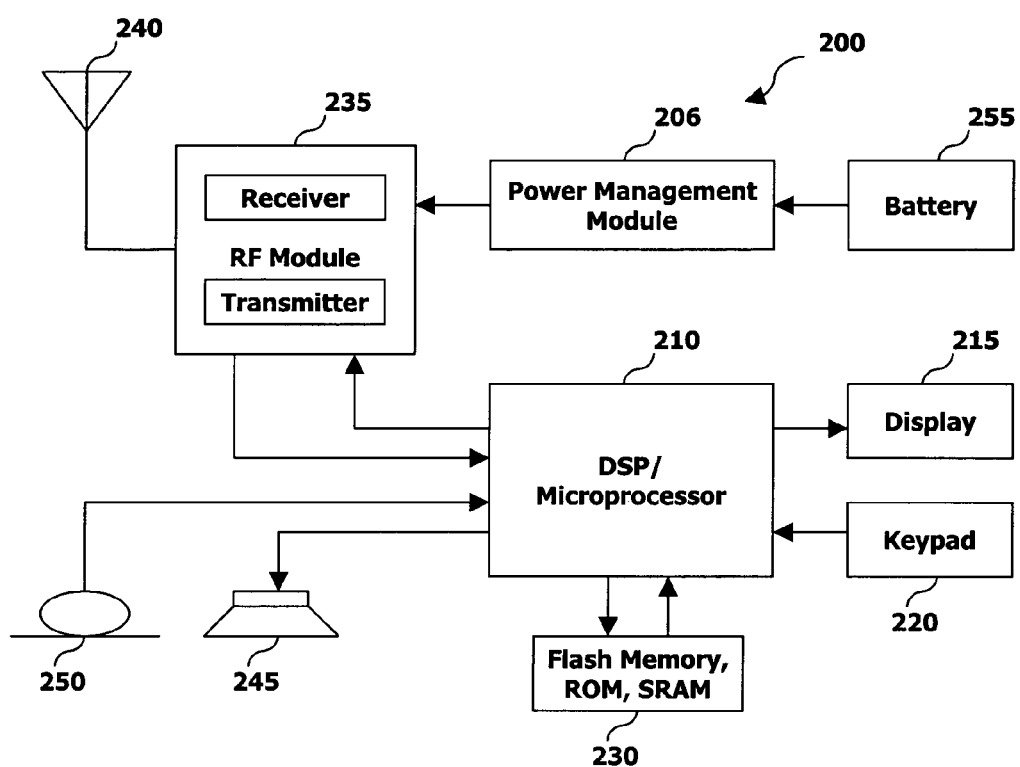
FIG. 16 illustrates a mobile communication device according to one embodiment of the present invention.

Referring to FIG. 16, a block diagram of a mobile communication device 200 of the present invention is illustrated, for example a mobile phone for performing the methods of the present invention. The mobile communication device 200 includes a processing unit 210 such as a microprocessor or digital signal processor, an RF module 235, a power management module 205, an antenna 240, a battery 255, a display 215, a keypad 220, a storage unit 230 such as flash memory, ROM or SRAM, a speaker 245 and a microphone 250.

A user enters instructional information, such as a telephone number, for example, by pushing the buttons of the keypad 220 or by voice activation using the microphone 250. The processing unit 210 receives and processes the instructional information to perform the appropriate function, such as to dial the telephone number. Operational data may be retrieved from the memory unit 230 to perform the function. Furthermore, the processing unit 210 may display the instructional and operational information on the display 215 for the user's reference and convenience.

The processing unit 210 issues instructional information to the RF module 235, to initiate communication, for example, by transmitting radio signals comprising voice communication data. The RF module 235 includes a receiver and a transmitter to receive and transmit radio signals. The antenna 240 facilitates the transmission and reception of radio signals. Upon receiving radio signals, the RF module 235 may forward and convert the signals to baseband frequency for processing by the processing unit 210. The processed signals may be transformed into audible or readable information output, for example, via the speaker 245.

The RF module 235 and antenna 240 are adapted to receive an information message from the network 4 and to transmit a message to the network and the storage unit 230 is adapted to store information associated with one or more configurations. The processing unit 210 is adapted to process an information message indicating one or more available configurations for transmitting a message, select one of the available configurations and transmit a message utilizing the selected configuration.

It will be apparent to one skilled in the art that the preferred embodiments of the present invention can be readily implemented using, for example, the processor 210 or other data or digital processing device, either alone or in combination with external support logic.

Figure 17:
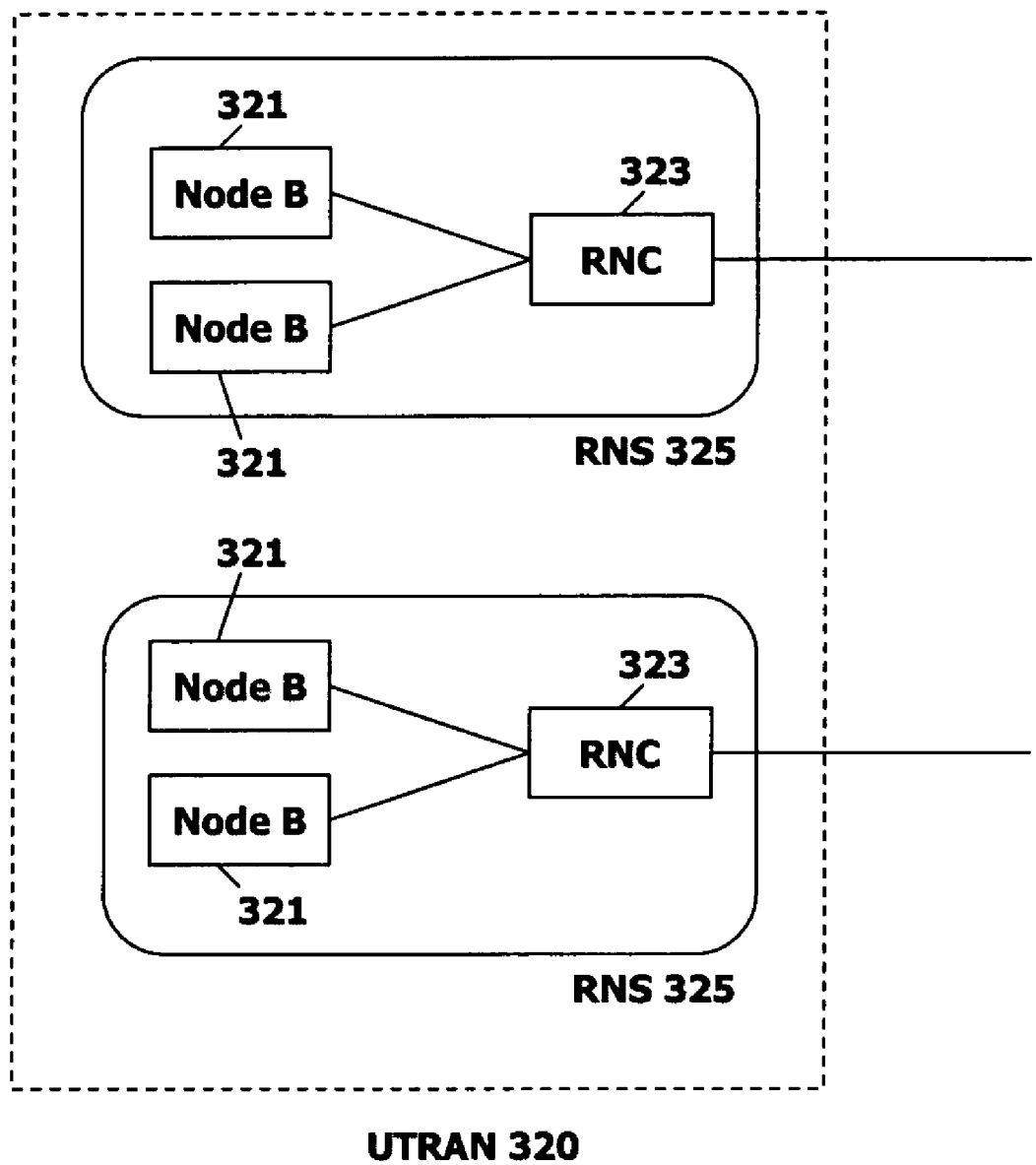
FIG. 17 illustrates a network according to one embodiment of the present invention.

FIG. 17 illustrates a block diagram of a UTRAN 320 according to one embodiment of the present invention. The UTRAN 320 includes one or more radio network sub-systems (RNS) 325. Each RNS 325 includes a radio network controller (RNC) 323 and a plurality of Node-Bs 321, or base stations, managed by the RNC. The RNC 323 handles the assignment and management of radio resources and operates as an access point with respect to the core network 4. Furthermore, the RNC 323 is adapted to perform the methods of the present invention.

The Node-Bs 321 receive information sent by the physical layer of a mobile terminal 200 through an uplink and transmit data to the mobile terminal through a downlink. The Node-Bs 321 operate as access points, or as a transmitter and receiver, of the UTRAN 320 for a mobile terminal 200.

The Node-Bs 321 are adapted to transmit an information message to one or more mobile terminals 200 and to receive a message from one or more mobile terminals. The RNC 323 is adapted to generate an information message, the information message indicating one or more available configurations for transmitting a message, and process a message from one or more mobile terminals 200, the message transmitted utilizing one of the available configurations.

The present invention enables a mobile terminal to transmit messages to a network via a CCCH that have a larger transport block size than is currently supported by providing extended PRACH configurations. By utilizing existing messages transmitted by the network to the mobile terminal to indicate the available PRACH configurations, those mobile terminals that support the extended PRACH configurations may utilize the extended configurations while mobile terminals that do not support the extended PRACH configurations may utilize the existing configurations.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and /or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in different order, modified or removed and still implement preferred embodiments of the present invention. Moreover, steps may be added to the above described logic and still conform to implementations of the invention.

What is claimed is:

1. A method of transmitting control information from a mobile terminal in a network, the method comprising:
   receiving a first message in the mobile terminal, the first message including information indicating at least one available configuration for transmitting a second message, the second message including at least a portion of the control information;
   selecting one of the at least one available configuration in the mobile terminal; and
   transmitting the second message from the mobile terminal utilizing the selected configuration,
   wherein the at least one available configuration is physical random access channel (PRACH) information related to a common control channel (CCCH) logical channel, the information including additional transport format information for the CCCH comprising at least one of a RLC (Radio Link Control) size, a transport block size, or number of transport blocks.

2. The method of claim 1, wherein the at least one available configuration comprises a legacy configuration mode and legacy configuration identity.

3. The method of claim 1, wherein the at least one available configuration comprises a predefined configuration mode and a predefined configuration identity.

4. The method of claim 3, wherein the predefined configuration mode comprises at least one of utilizing an additional channel, utilizing an increased message block size for an existing channel, utilizing a new channel mapping configuration, or utilizing a new message format.

5. The method of claim 4, wherein the additional channel comprises a logical channel or a physical channel.

6. The method of claim 4, wherein the existing channel comprises a logical channel or a physical channel.

7. The method of claim 4, wherein the new channel mapping configuration is associated with mapping a logical channel to a physical channel.

8. The method of claim 1, wherein the first message is received via a common channel.

9. The method of claim 8, wherein the information indicating the at least one available configuration for transmitting the second message is included in an extension portion of the first message.

10. The method of claim 1, wherein the first message is received via a dedicated channel.

11. The method of claim 10, wherein the first message is an RRC connection setup message.

12. The method of claim 1, wherein selecting one of the at least one available configuration comprises determining the size of the second message.

13. A method of transmitting control information between at least one mobile communication device and a network, the method comprising:
   providing at least one new configuration for transmitting a message in the at least one mobile communication device, the at least one new configuration comprising at least one of utilizing an additional channel, utilizing an increased message block size for an existing channel, utilizing a new channel mapping configuration, or utilizing a new message format;
   transmitting a first message from the network to the at least one mobile communication device, the first message including information indicating the at least one new configuration;
   selecting one of the at least one new configuration in the at least one mobile communication device; and
   transmitting a second message from the at least one mobile communication device to the network utilizing the selected configuration, the second message including at least a portion of the control information,
   wherein the at least one new configuration is physical random access channel (PRACH) information related to a common control channel (CCCH) logical channel, the information including additional transport format information for the CCCH comprising at least one of a RLC (Radio Link Control) size, a transport block size, or number of transport blocks.

14. The method of claim 13, wherein the additional channel comprises a logical channel or a physical channel.

15. The method of claim 13, wherein the existing channel comprises a logical channel or a physical channel.

16. The method of claim 13, wherein the new mapping configuration is associated with mapping a logical channel to a physical channel.

17. The method of claim 13, wherein the first message is transmitted via a common channel to a plurality of mobile communication devices.

18. The method of claim 17, wherein information indicating the at least one new configuration is included in an extension portion of the first message such that a mobile communication device that does not incorporate the at least one new configuration does not interpret the information.

19. The method of claim 13, wherein the first message is transmitted via a dedicated channel to a specific mobile communication device.

20. The method of claim 19, wherein the first message is an RRC connection setup message.

21. The method of claim 13, wherein selecting one of the at least one new configuration comprises determining the size of the second message.

22. A method of transmitting control information to at least one mobile terminal, the method comprising:
   transmitting a first message to the at least one mobile terminal, the first message including information indicating at least one available configuration for transmitting a second message, the second message including at least a portion of the control information; and receiving the second message from the at least one mobile terminal, the second message transmitted utilizing one of the at least one available configuration, wherein the at least one available configuration is physical random access channel (PRACH) information related to a common control channel (CCCH) logical channel, the information including additional transport format information for the CCCH comprising at least one of a RLC (Radio Link Control) size, a transport block size, or number of transport blocks.

23. The method of claim 22, wherein the at least one available configuration comprises a legacy configuration mode and legacy configuration identity.

24. The method of claim 22, wherein the at least one available configuration comprises a predefined configuration mode and a predefined configuration identity.

25. The method of claim 24, wherein the predefined configuration mode comprises at least one of utilizing an additional channel, utilizing an increased message block size for an existing channel, utilizing a new channel mapping configuration, or utilizing a new message format.

26. The method of claim 25, wherein the additional channel comprises a logical channel or a physical channel.

27. The method of claim 25, wherein the existing channel comprises a logical channel or a physical channel.

28. The method of claim 25, wherein the new channel mapping configuration is associated with mapping a logical channel to a physical channel.

29. The method of claim 22, wherein the first message is transmitted via a common channel to a plurality of mobile terminals.

30. The method of claim 29, wherein the information indicating the at least one available configuration is included in an extension portion of the first message.

31. The method of claim 22, wherein the first message is transmitted via a dedicated channel to a specific mobile terminal.

32. The method of claim 31, wherein the first message is an RRC connection setup message.

33. A mobile communication device for transmitting control information to a network, the mobile communication device comprising:

an RF module configured to receive a first message from the network and to transmit a second message to the network, the first message including information indicating at least one available configuration for transmitting the second message and the second message including at least a portion of the control information;

an antenna configured to receive the first message from the network and to transmit the second message to the network;

a keypad configured to input information from a user;

a storage unit configured to store information associated with the at least one available configuration for transmitting the second message;

a display configured to convey information to the user; and a processing unit configured to process the first message, select one of the at least one available configuration and transmit the second message utilizing the selected configuration, wherein the at least one available configuration is physical random access channel (PRACH) information related to a common control channel (CCCH) logical channel, the information including additional transport format information for the CCCH comprising at least one of a RLC (Radio Link Control) size, a transport block size, or number of transport blocks.

34. The mobile communication device of claim 33, wherein the at least one available configuration comprises a legacy configuration mode and legacy configuration identity.

35. The mobile communication device of claim 33, wherein the at least one available configuration comprises a predefined configuration mode and a predefined configuration identity.

36. The mobile communication device of claim 35, wherein the predefined configuration mode comprises at least one of utilizing an additional channel, utilizing an increased message block size for an existing channel, utilizing a new channel mapping configuration, or utilizing a new message format.

37. The mobile communication device of claim 36, wherein the additional channel comprises a logical channel or a physical channel.

38. The mobile communication device of claim 36, wherein the existing channel comprises a logical channel or a physical channel.

39. The mobile communication device of claim 36, wherein the new channel mapping configuration is associated with mapping a logical channel to a physical channel.

40. The mobile communication device of claim 33, wherein the first message is received via a common channel.

41. The mobile communication device of claim 40, wherein the information indicating the at least one available configuration is included in an extension portion of the first message.

42. The mobile communication device of claim 33, wherein the first message is received via a dedicated channel.

43. The mobile communication device of claim 42, wherein the first message is an RRC connection setup message.

44. The mobile communication device of claim 33, wherein the processor is configured to select one of the at least one available configuration by determining the size of the second message.

45. A network for transmitting control information to at least one mobile terminal, the network comprising:

a transmitter configured to transmit a first message to the at least one mobile terminal, the first message including information indicating at least one available configuration for transmitting a second message;

a receiver configured to receive the second message from the at least one mobile terminal, the second message including at least a portion of the control information; and a controller configured to generate the first message and process the second message from the at least one mobile terminal, the second message transmitted utilizing one of the at least one available configuration, wherein the at least one available configuration is physical random access channel (PRACH) information related to a common control channel (CCCH) logical channel, the information including additional transport format information for the CCCH comprising at least one of a RLC (Radio Link Control) size, a transport block size, or number of transport blocks.

46. The network of claim 45, wherein the at least one available configuration comprises a legacy configuration mode and legacy configuration identity.

47. The network of claim 45, wherein the at least one available configuration comprises a predefined configuration mode and a predefined configuration identity.

48. The network of claim 47, wherein the predefined configuration mode comprises at least one of utilizing an additional channel, utilizing an increased message block size for an existing channel, utilizing a new channel mapping configuration, or utilizing a new message format.

49. The network of claim 48, wherein the additional channel comprises a logical channel or a physical channel.

50. The network of claim 48, wherein the existing channel comprises a logical channel or a physical channel.

51. The network of claim 48, wherein the new channel mapping configuration is associated with mapping a logical channel to a physical channel.

52. The network of claim 45, wherein the first message is transmitted via a common channel to a plurality of mobile terminals.

53. The network of claim 52, wherein the information indicating the at least one available configuration is included in an extension portion of the first message.

54. The network of claim 37, wherein the first message is transmitted via a dedicated channel to a specific mobile terminal.

55. The network of claim 54, wherein the first message is an RRC connection setup message.

56. The method of claim 1, wherein the first or second message is a RRC (Radio Resource Control) message.

57. The method of claim 56, wherein the RRC message is associated with a signaling radio bearer 0 (SRB0).

58. The method of claim 13, wherein at least the first or second message is a RRC (Radio Resource Control) message.

59. The method of claim 58, wherein the RRC message is associated with a signaling radio bearer 0 (SRB0).

60. The method of claim 22, wherein at least the first or second message is a RRC (Radio Resource Control) message.

61. The method of claim 60, wherein the RRC message is associated with a signaling radio bearer 0 (SRB0).

62. The mobile communication device of claim 33, wherein at least the first or second message is a RRC (Radio Resource Control) message.

63. The mobile communication device of claim 62, wherein the RRC message is associated with a signaling radio bearer 0 (SRB0).

64. The network of claim 45, wherein at least the first or second message Is a RRC (Radio Resource Control) message.

65. The network of claim 64, wherein the RRC message is associated with a signaling radio bearer 0 (SRB0).

\* \* \* \* \*